United States Patent
Fukunaga (10) Patent No.: US 8,483,482 B2
(45) Date of Patent: Jul. 9, 2013

(54) IMAGE PROCESSING DEVICE, IMAGE PROCESSING METHOD AND COMPUTER-READABLE MEDIUM

(75) Inventor: Masakazu Fukunaga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 737 days.

(21) Appl. No.: 12/702,707

(22) Filed: Feb. 9, 2010

(65) Prior Publication Data

US 2011/0007972 A1    Jan. 13, 2011

(30) Foreign Application Priority Data

Jul. 10, 2009   (JP) .................................. 2009-163704

(51) Int. Cl.
*G06K 9/34* (2006.01)

(52) U.S. Cl.
USPC ......................................................... 382/176

(58) Field of Classification Search
None
See application file for complete search history.

(56) References Cited

U.S. PATENT DOCUMENTS

| | | | | |
|---|---|---|---|---|
| 5,802,535 A * | 9/1998 | Shibuta | .......................... | 715/209 |
| 6,567,546 B1 * | 5/2003 | Eguchi et al. | .................. | 382/181 |
| 8,201,084 B2 * | 6/2012 | Konno | .......................... | 715/243 |
| 2005/0128297 A1 * | 6/2005 | Katsuyama | ................... | 348/155 |
| 2010/0238518 A1 * | 9/2010 | Fukunaga | ..................... | 358/453 |

FOREIGN PATENT DOCUMENTS

| | | |
|---|---|---|
| JP | A-2-210586 | 8/1990 |
| JP | A-3-102964 | 4/1991 |
| JP | A-8-249419 | 9/1996 |
| JP | A-2005-190094 | 7/2005 |
| JP | A-2007-213255 | 8/2007 |

* cited by examiner

*Primary Examiner* — Vikkram Bali
(74) *Attorney, Agent, or Firm* — Oliff & Berridge, PLC (57) ABSTRACT

An image-processing device comprises an acquisition section that acquires a binary image; a figure part identifying section that identifies a figure part in the binary image; a line segment identifying section that identifies line segments included in the figure part; a specific line segment extracting section that determines whether each line segment has an end portion having a specific shape, and extracts a line segment with an end portion having the specific shape as a specific line segment; and a table region determining section that determines whether the figure part is a table region based on the line segments identified by the line segment identifying section excluding the specific line segment.

8 Claims, 7 Drawing Sheets

| FIGURE IDENTIFIER | LABEL | COORDINATES | LABELS OF INTERSECTING LINE SEGMENTS |
|---|---|---|---|
| 1 | Li110 | (x1,y1)(x1,y2) | Li115,Li116,Li117 |
| | Li111 | (x2,y3)(x2,y2) | Li115,Li116,Li117 |
| | Li112 | (x3,y3)(x3,y2) | Li115,Li116,Li117 |
| | Li115 | (x1,y2)(x4,y2) | Li110,Li111,Li112 |
| | Li116 | (x1,y4)(x4,y4) | Li110,Li111,Li112 |
| | Li117 | (x1,y2)(x5,y2) | Li110,Li111,Li112 |
| 2 | Li120 | (x11,y11)(x11,y12) | Li125,Li126,Li127 |
| | Li121 | (x12,y11)(x12,y12) | Li125,Li126,Li127 |
| | Li122 | (x13,y11)(x13,y12) | Li125,Li126,Li127 |
| | Li125 | (x11,y11)(x14,y11) | Li120,Li121,Li122 |
| | Li126 | (x11,y14)(x14,y14) | Li120,Li121,Li122 |
| | Li127 | (x11,y12)(x14,y12) | Li120,Li121,Li122 |

| FIGURE IDENTIFIER | LABEL | COORDINATES | LABELS OF INTERSECTING LINE SEGMENTS |
|---|---|---|---|
| 1 | Li111 | (x2,y3)(x2,y2) | Li115,Li116,Li117 |
| 1 | Li112 | (x3,y3)(x3,y2) | Li115,Li116,Li117 |
| 1 | Li115 | (x1,y2)(x4,y2) | Li110,Li111,Li112 |
| 1 | Li116 | (x1,y4)(x4,y4) | Li110,Li111,Li112 |
| 2 | Li120 | (x11,y11)(x11,y12) | Li125,Li126,Li127 |
| 2 | Li121 | (x12,y11)(x12,y12) | Li125,Li126,Li127 |
| 2 | Li122 | (x13,y11)(x13,y12) | Li125,Li126,Li127 |
| 2 | Li125 | (x11,y11)(x14,y11) | Li120,Li121,Li122 |
| 2 | Li126 | (x11,y14)(x14,y14) | Li120,Li121,Li122 |
| 2 | Li127 | (x11,y12)(x14,y12) | Li120,Li121,Li122 |

| FIGURE IDENTIFIER | LABEL | COORDINATES | LABELS OF INTERSECTING LINE SEGMENTS |
|---|---|---|---|
| 1 | Li130 | (x1,y1)(x1,y2) | Li135,Li141,Li142,Li136 Li143,Li144,Li137 |
| | Li131 | (x2,y3)(x2,y2) | Li135,Li136,Li137 |
| | Li132 | (x3,y3)(x3,y2) | Li135,Li136,Li137 |
| | Li135 | (x1,y2)(x4,y2) | Li130,Li131,Li132 |
| | Li136 | (x1,y4)(x4,y4) | Li130,Li131,Li132 |
| | Li137 | (x1,y2)(x5,y2) | Li130,Li145,Li146,Li131 Li147,Li148,Li132 |
| | Li141 | (x1,y5)(x6,y5) | Li130 |
| | Li142 | (x1,y6)(x6,y6) | Li130 |
| | Li143 | (x1,y7)(x6,y7) | Li130 |
| | Li144 | (x1,y8)(x6,y8) | Li130 |
| | Li145 | (x7,y9)(x7,y2) | Li137 |
| | Li146 | (x8,y9)(x8,y2) | Li137 |
| | Li147 | (x9,y9)(x9,y2) | Li137 |
| | Li148 | (x10,y9)(x10,y2) | Li137 |

| FIGURE IDENTIFIER | LABEL | COORDINATES | LABELS OF INTERSECTING LINE SEGMENTS |
|---|---|---|---|
| 1 | Li131 | (x2,y3)(x2,y2) | Li135,Li136,Li137 |
| | Li132 | (x3,y3)(x3,y2) | Li135,Li136,Li137 |
| | Li135 | (x1,y2)(x4,y2) | Li130,Li131,Li132 |
| | Li136 | (x1,y4)(x4,y4) | Li130,Li131,Li132 |

TB10

FIG. 13

IMAGE PROCESSING DEVICE, IMAGE PROCESSING METHOD AND COMPUTER-READABLE MEDIUM

CROSS-REFERENCE TO RELATED APPLICATIONS

This application is based on and claims priority under 35 U.S.C. 119 from Japanese Patent Application No. 2009-163704, which was filed on Jul. 10, 2009.

BACKGROUND

1. Technical Field

The present invention relates to an image-processing device, an image-processing method, and a computer-readable medium.

2. Related Art

A technique for recognizing a table region in an image has been proposed.

SUMMARY

In one aspect of the present invention, there is provided an image-processing device comprising an acquisition section that acquires a binary image represented by first pixels each having a first pixel value, and second pixels each having a second pixel value; a figure part identifying section that identifies a figure part in the binary image; a line segment identifying section that identifies line segments included in the figure part identified by the figure part identifying section; a specific line segment extracting section that determines whether each line segment identified by the line segment identifying section has an end portion having a specific shape, and extracts a line segment with an end portion having the specific shape as a specific line segment; and a table region determining section that determines whether the figure part identified by the figure part identifying section is a table region based on the line segments identified by the line segment identifying section excluding the specific line segment extracted by the specific line segment extracting section.

BRIEF DESCRIPTION OF THE DRAWINGS

Exemplary embodiments of the present invention will be described in detail based on the following figures, wherein.

DETAILED DESCRIPTION

[First Exemplary Embodiment]
(Structure of First Exemplary Embodiment)

Figure 1:
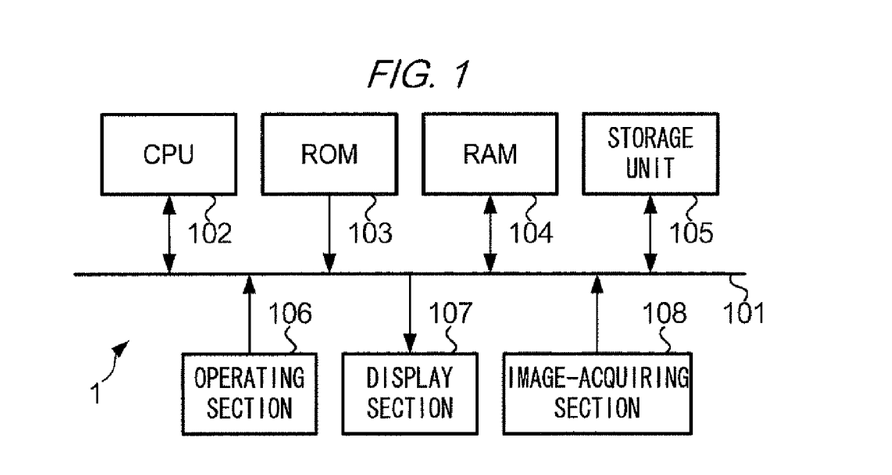
FIG. 1 is a block diagram showing a hardware structure of computer device 1.

FIG. 1 is a block diagram showing a hardware structure of computer device 1 according to a first exemplary embodiment of the present invention. In this exemplary embodiment, computer device 1 is constituted of a PC (Personal Computer), and various parts of the PC are connected to bus 101 for communication of information.

Display section 107 includes a LCD (liquid crystal display), CRT (Cathode Ray Tube), ELD (electroluminescent display), or the like for displaying images. Display section 107 is controlled by CPU (Central Processing Unit) 102 to cause menus, a variety of messages, and the like to be shown on the display for operation of computer device 1.

Operating section 106 includes an input device such as a keyboard, a mouse, and the like for input of instructions into and carrying out of control operations in computer device 1.

Image-acquiring section 108 includes an interface for connection with a scanner. The scanner reads an image on a recording medium such as a sheet of paper, creates image data of the image, and upon communication with image acquiring section 108 provides the image data to image acquiring section 108.

Storage unit 105 may be a hard disk or other storage device and is used to store a program for causing computer device 1 to execute functions of an operating system, to store an image-processing program for processing image data, and also to store image data acquired through the scanner.

ROM (Read Only Memory) 103 stores an IPL (Initial Program Loader), and CPU 102 reads out the IPL stored in ROM 103 and executes the same. Upon execution of the IPL, a program for implementing the operating system is read out from storage unit 105, and executed. Once the program for implementing the operating system is executed, CPU 102 can run the image-processing program. The execution of an image-processing program by CPU 102 causes computer device 1 to function as an image-processing device that processes the image represented by the image data, and whereby a function for identifying a table region in an image is implemented.

Figure 2:
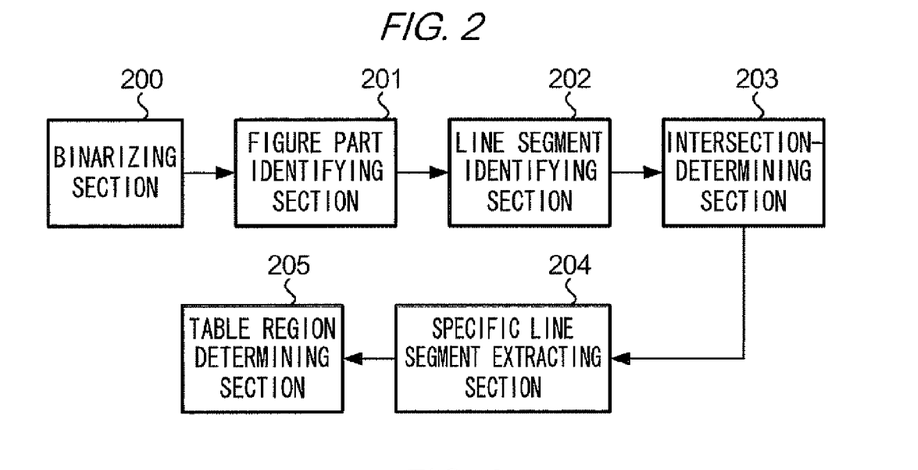
FIG. 2 shows functional blocks implemented in computer device 1 according to a first exemplary embodiment of the invention.

FIG. 2 shows functional blocks implemented by execution of an image-processing program by CPU 102.

Binarizing section 200 is a section that binarizes the image represented by the image data acquired by image-acquiring section 108 into a black-and-white image, and exemplifies an acquisition section that acquires a binarized image (hereinafter referred to as a binary image). In this exemplary embodiment, a value of each pixel in a binary image is represented by one (1) bit, in which a black pixel is represented by "1" and a white pixel is represented by "0," with white pixels forming a background image. Conversely, a black pixel may be represented by "0" and a white pixel by "1."

Figure part identifying section 201 is a section that identifies figure parts included in the binary image. As a technique for identifying figure parts in an image, any known technique may be adopted such as that described in Japanese Patent Application Laid-Open Publication No. 3-102964, for example. It is to be noted, however, that the technique for identifying figure parts in an image is not limited to that described in Publication No. 3-102964, and other techniques may be utilized.

Line segment identifying section 202 is a section for identifying line segments contained in the figure parts identified by figure part identifying section 201. As a technique for identifying line segments, various known techniques may be adopted such as that disclosed in Japanese Patent Application Laid-Open Publication No. 2-210586, in which scanning of a binary image is conducted to identify a string of continuously arranged black pixels as a line segment if the number of continuously arranged black pixels constituting the string is larger than a prescribed threshold number. It is to be noted, however, that the technique for identifying line segments contained in figure parts in an image is not limited to that described in Publication No. 2-210586, and other techniques may be utilized. It should be also understood that in the present specification, the term "line segment" is not intended to be interpreted as a strict mathematical concept, but rather as a substantially linear image object with a limited length constituted of a plurality of pixels.

Intersection-determining section 203 is a section for determining whether line segments identified by line segment identifying section 202 intersect each other based on a start point, end point, length, and so on of each line segment.

Specific line segment extracting section 204 is a section that recognizes a shape of an end portion of each line segment identified by line segment identifying section 202, and extracts line segment(s) having a prescribed specific end portion shape. Specific line segment extracting section 204 recognizes and judges the end portion shape of each line segment by using a technique such as pattern matching, statistical identification method, structure identification method, or the like.

Table region determining section 205 determines that the line segments identified by intersection-determining section 203 as not intersecting other line segments and the line segments extracted by specific line segment extracting section 204 are not line segments that constitute a table, and judges whether the remaining line segments constitute a table. As a technique for judging whether a plurality of line segments constitute a table, a technique disclosed in Japanese Patent Application Laid-Open Publication No. 8-249419 may be adopted, for example, in which the number of black pixels constituting the line segments contained in each figure part is divided by the number of black pixels constituting line segments judged as potentially constituting a table in the figure part, and whether the line segments constitute a table is judged based on the value derived by the division. It is to be noted, however, that the technique for determining a table region from a plurality of line segments is not limited to that described in Publication No. 8-249419, and other techniques may be utilized.

(Operation of First Exemplary Embodiment)

In the following, explanation will be made of an operation of the first exemplary embodiment of the present invention. When a sheet of paper having thereon an image is placed by a user on a scanner connected to image-acquiring section 108 and the scanner is operated to read the image, image data representing the image is generated by the scanner. Subsequently, when the user operates the operating section 106 to instruct acquisition of the image data generated by the scanner, image-acquiring section 108 communicates with the scanner to acquire the image data and stores the acquired data in storage unit 105.

Further, when the user instructs execution of an image-processing program through operation of operating section 106, the image-processing program is executed by CPU 102. Then, when the user specifies image data stored in storage unit 105 and instructs to conduct image processing on the specified image data through operation of operating section 106, CPU 102 executes the process shown in FIG. 3 according to the image-processing program.

Figure 3:
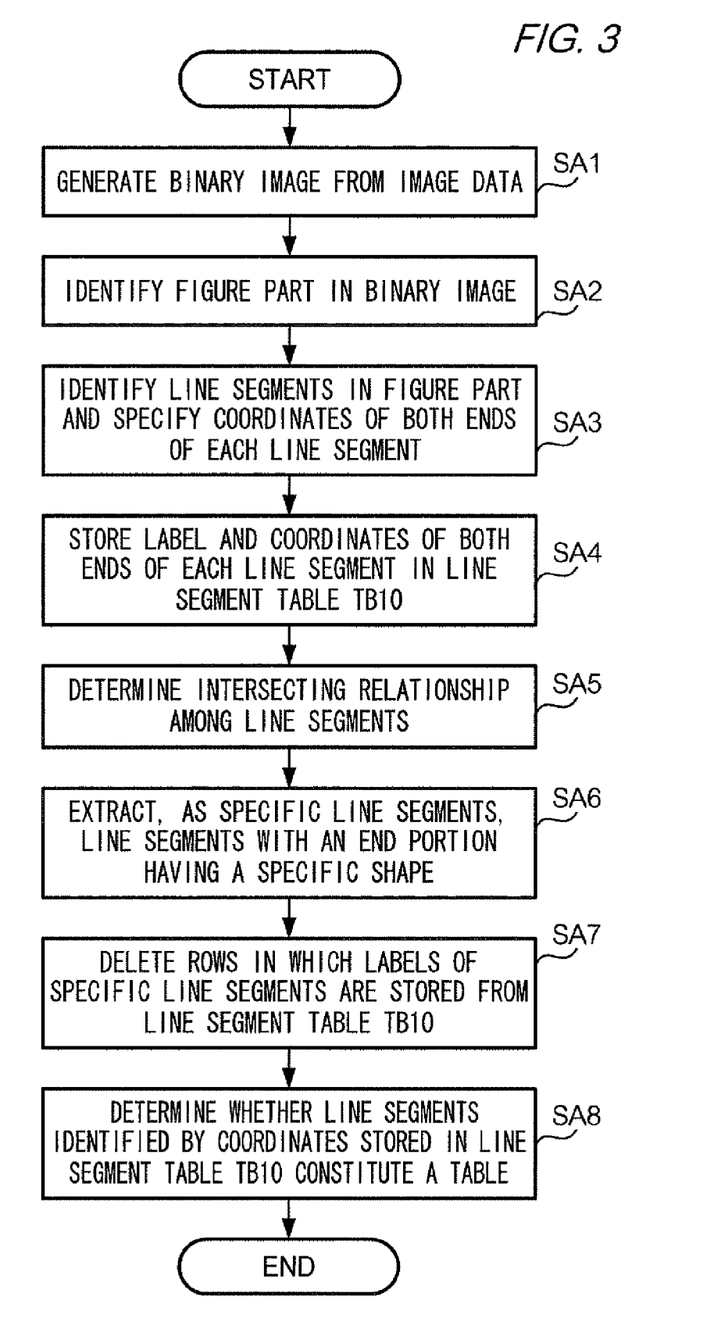
FIG. 3 is a flowchart showing a process flow executed by CPU 102 according to the first exemplary embodiment of the invention.
Figure 4:
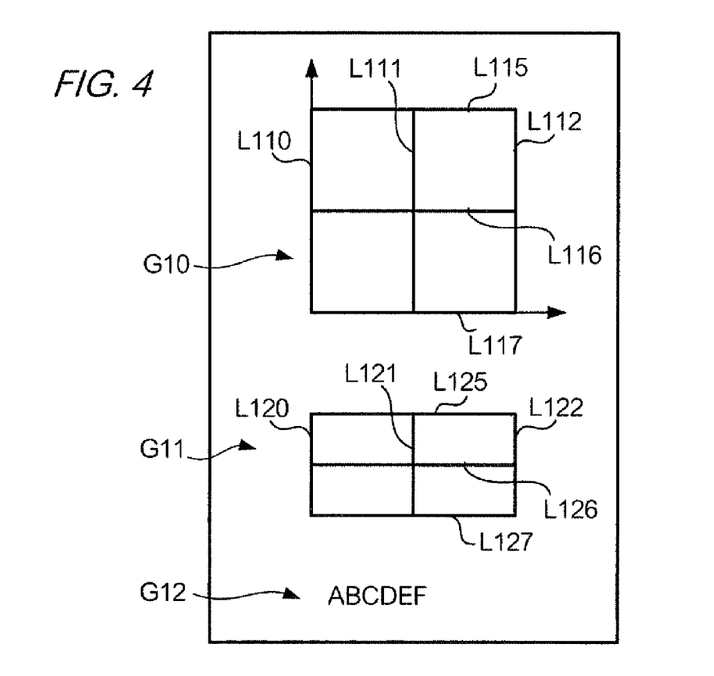
FIG. 4 is a schematic diagram showing an example of a binary image regarding the first exemplary embodiment of the invention.

Specifically, CPU 102 first performs a process (step SA1) for binarizing the image data specified by the user. FIG. 4 shows an example of an image obtained by the binarizing process. In FIG. 4, image object G 10 represents an image of a graph, and image object Gil represents an image of a table constituted by a plurality of line segments. Further, image object G12 represents an image of a string of characters. It should be noted that CPU 102 that binarizes the image data functions as binarizing section 200.

Following the binarizing process, CPU 102 analyzes the binary image and identifies figure part(s) in the binary image (step SA2). For example, in the binary image of FIG. 4, image object G10 and image object G11 are identified as figure parts while image object G12 representing a character string is not identified as a figure part. After identifying figure parts in the binary image, CPU 102 generates figure identifiers for identifying each figure part uniquely. For example, a figure identifier "1" is generated for image object G10 and a figure identifier "2" is generated for image object Gil. It should be noted here that CPU 102 that identifies figure parts in the binary image serves as figure part identifying section 201

Next, CPU 102 scans the binary image to identify line segment(s) included in each identified figure part, and determines coordinates of both ends of each line segment (step SA3). For example, in the binary image of FIG. 4, line segments L110-L112 extending in a vertical direction in FIG. 4 and line segments L115-L117 extending in a horizontal direction in FIG. 4 are identified in image object G10. Further, in image object G11, line segments L120-L122 extending in a vertical direction in FIG. 4 and line segments L125-L127 extending in a horizontal direction are identified. The coordinates of these line segments may be obtained, for example, by setting the lower left point of the image as the origin, with x-axis extending horizontally to pass the origin and y-axis extending vertically to pass the origin. It should be noted here that CPU 102, which identifies line segments in the figure parts, serves as line segment identifying section 202.

Figure 5:
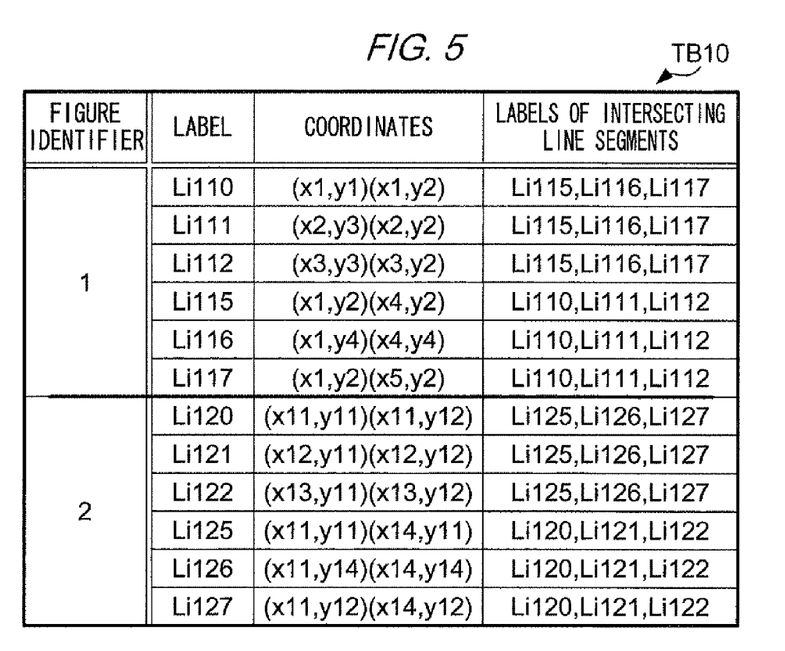
FIG. 5 shows an example of content of line segment table TB10 obtained by processing the image of FIG. 4 according to the first exemplary embodiment of the invention.

After identifying line segments in each figure part, CPU 102 labels each line segment with a number (hereinafter referred to as a "label") that uniquely indicates each line segment. Then, the figure identifiers allocated to the respective figure parts, the labels allocated to the respective line segments included in the figure parts identified by the figure identifiers, and the coordinates of both ends of each line segment are associated with each other and stored in line segment table TB10 provided in RAM (Random Access Memory) 104 (step SA4). FIG. 5 shows an example of content of line segment table TB10. As shown, line segment table TB10 stores the figure identifiers, labels, and coordinates of both ends of each line segment. Further, line segment table TB10 stores for each line segment a list of labels of other line segments that intersect the line segment.

For instance, for line segment L110 identified in image object G10 which is allocated a figure identifier "1," coordinates (x1, y1) (x1, y2) are specified and label "Li110" is generated, and then label "Li110" and coordinates (x1, y1) (x1, y2) are stored in association with figure identifier "1," as shown in FIG. 5.

Also, for line segment L120 identified in image object G11 which is allocated a figure identifier "2," coordinates (x11, y11) (x11, y12) are specified and label "Li120" is generated, and then label "Li120" and coordinates (x11, y11) (x11, y12) are stored in association with figure identifier "2," as shown in FIG. 5.

In the illustrated example shown in FIG. 5, with regard to the image of FIG. 4, label "Li111" is generated for line segment L111, label "Li112" for line segment L112, label "Li115" for line segment L115, label "Li116" for line segment L116, and label "Li117" for line segment L117. Further, in the illustrated example shown in FIG. 5, with regard to the image of FIG. 4, label "Li121" is generated for line segment L121, label "Li122" for line segment L122, label "Li125" for line segment L125, label "Li126" for line segment L126, and label "Li127" for line segment L127.

After completion of the process of step SA4, CPU 102 refers to the line segments allocated respective labels to determine an intersecting relationship between line segments (step SA5). Then, for each line segment, CPU 102 stores in line segment table TB10 the labels of other line segments that intersect the line segment. Thus, CPU 102 here serves as intersection-determining section 203 that determines an intersecting relationship between line segments.

For example, in the image of FIG. 4, line segments L115, L116, and L117 intersect line segment L110, and thus labels Li115, Li116, and Li117 of line segments L115-L117 are stored so as to be associated with label Li110 of line segment L110, as shown in FIG. 5. Also, because line segments L125, L126, and L127 intersect line segment L120, labels Li125, Li126, and Li127 of line segments L125-L127 are stored in association with label Li120 of line segment L120, as shown in FIG. 5.

It is to be understood from the foregoing explanation that in this specification, two line segments that are not parallel with each other are considered as intersecting each other not only when one line segment passes through the other line segment, but also when an end of one line segment resides on the other line segment.

After determining the intersecting line segments for each line segment, CPU 102 judges a shape of end portions of each line segment and extracts line segments that have a specific end shape(s) (step SA6). For example, in the image of FIG. 4, one end portion of line segment L110 has an arrow shape. CPU 102 extracts line segments with an end portion having a predetermined specific shape (such as line segment L110 with an arrow-shaped end portion) as specific line segments that do not constitute a table. Thus, line segment L117, which also has an end portion in an arrow shape, is extracted as a line segment not constituting a table. Thus, CPU 102 here serves as specific line segment extracting section 204. It should be noted that the line segments constituting image object G11 each have a rectangular outer shape or profile, and thus are determined as line segments that may constitute a table.

It should be also noted that the line segments extracted as specific line segments that do not constitute a table may not be limited to those with an end portion having an arrow shape, and specific line segments to be extracted may include line segments with an end portion having another specific shape, such as a line segment with an end portion having a width different from the width of another portion of the line segment (e.g., a middle portion of the line segment), a line segment having a fork-shaped end portion, a line segment having a round or elliptic end portion, or a line segment with a polygonal end portion having a larger width than another portion of the line segment, for example.

Subsequently, CPU 102 deletes the rows of line segment table TB10 in which the labels of the line segments extracted as specific line segments in step SA6 are contained (step SA7). As a result, line segment table TB10 of FIG. 5 is converted into the table shown in FIG. 6, in which, among the rows related with figure identifier "1," the rows containing labels Li110 and Li117 have been deleted. It is to be noted that if there is a line segment that has no intersecting line segments, a row containing the label of such a line segment may be deleted from line segment table TB10.

Figure 6:
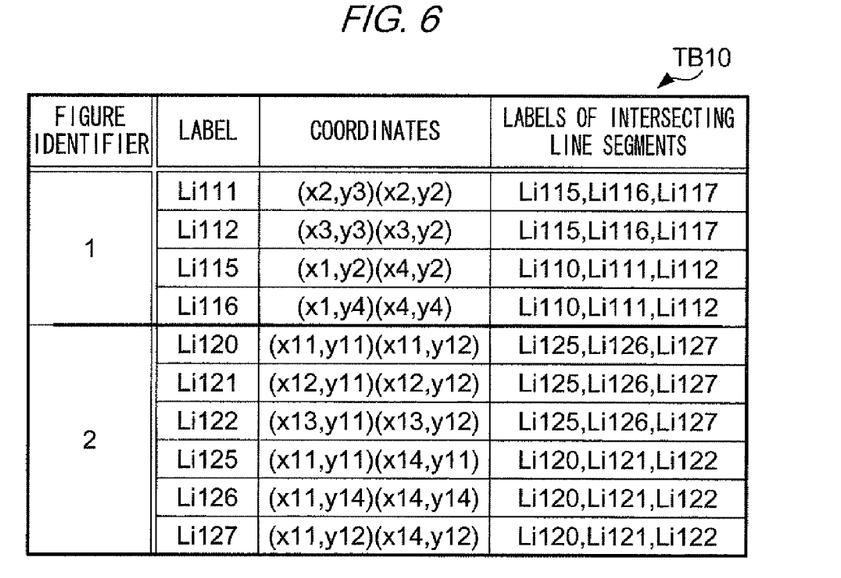
FIG. 6 shows line segment table TB10 after deletion of rows corresponding to some labels according to the first exemplary embodiment of the invention.

After line segment table TB10 of FIG. 6 is obtained, CPU 102 judges whether the remaining line segments specified by the coordinates contained in this line segment table TB10 constitute a table (step SA8). Thus, CPU 102 here serves as table region determining section 205. For example, in connection with the part allocated figure identifier "1," CPU 102 judges whether line segments L111, L112, L115, and L116 constitute a table.

Regarding the part allocated figure identifier "1," the total number of black pixels contained in this part is calculated as the sum of the number of black pixels representing line segments L110-L112 and line segments L115-L117. On the other hand, the number of black pixels of the line segments included in this part and judged as potentially constituting a table is calculated as the sum of the number of black pixels representing line segments L111, L112, L115, and L116. If a value obtained by dividing the sum of the number of black pixels representing line segments L111, L112, L115, and L116 with the sum of the number of black pixels representing line segments L110-L112 and line segments L115-L117 is smaller than a predetermined threshold value (for example, 0.9), CPU 102 determines that the part allocated figure identifier "1" is not a table region. It should be noted that the above threshold value of 0.9 is an example, and the threshold value may be other value.

On the other hand, in connection with the part allocated figure identifier "2," CPU 102 judges whether line segments L120-L122 and L125-L127 constitute a table. In the part allocated figure identifier "2," the total number of black pixels contained in this part is calculated as the sum of the number of black pixels representing line segments L120-L122 and line segments L125-L127. Further, the number of black pixels of the line segments included in this part and judged as potentially constituting a table is also calculated as the sum of the number of black pixels representing line segments L120-L122 and line segments L125-L127.

Thus, in this case, the value obtained by dividing the number of black pixels representing the line segments contained in this part and judged as potentially constituting a table with the total number of black pixels contained in this part is one (1), and hence is equal to or greater than the predetermined threshold value (e.g., 0.9), and therefore, CPU 102 determines that the part allocated figure identifier "2" is a table region.

Figure 7:
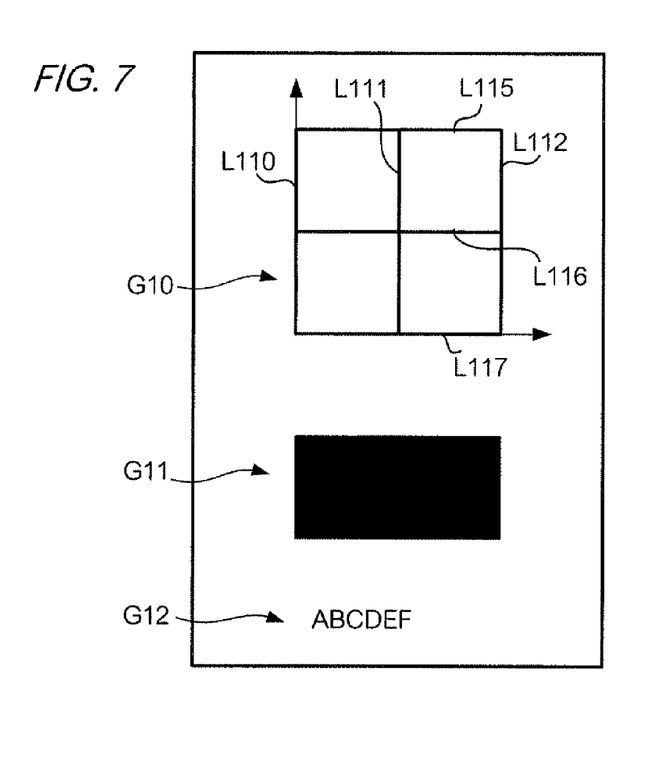
FIG. 7 schematically shows a result of identification of a table region

After determining a table region in the binary image, CPU 2 controls display section 107 to display an image such as that shown in FIG. 7, where the part judged to be a table region, i.e., image object G11, is colored black, for example, to thereby notify the user of the part judged to be a table region. It is to be noted, however, that the way of indicating the part judged to be a table region to the user is not thus limited, and any other way may be used, such as displaying an image in which the table region is surrounded by a rectangle, for example.

[Second Exemplary Embodiment]

(Structure of Second Exemplary Embodiment)

Next, explanation will be made of computer device 1 according to a second exemplary embodiment of the present invention. The hardware structure of computer device 1 in the second exemplary embodiment is the same as that of the first exemplary embodiment, but the image-processing program executed by CPU 102 (and hence the process carried out by CPU 102 that executes the image processing program) is different from that of the first exemplary embodiment. Thus, in the following, explanation of the hardware structure, which is the same as that described in the first exemplary embodiment, will be omitted, and the points that differ from the first exemplary embodiment will be explained.

Figure 8:
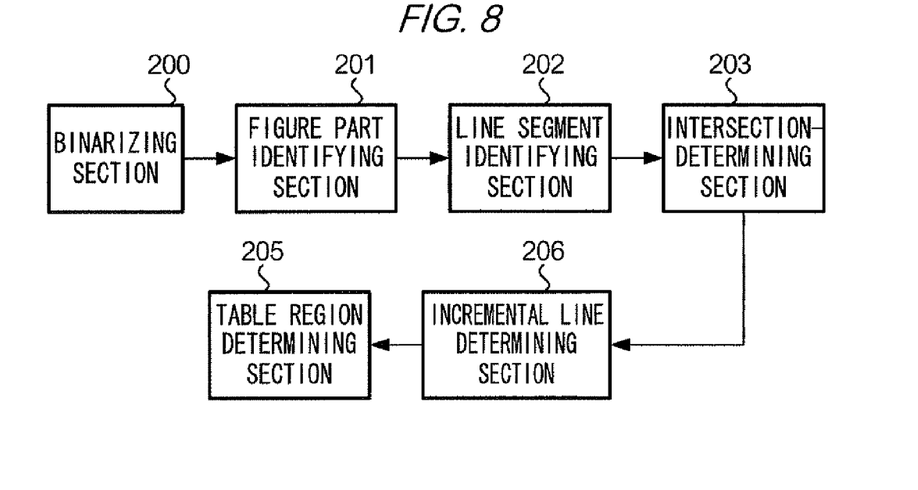
FIG. 8 shows functional blocks implemented in computer device 1 according to a second exemplary embodiment of the invention.

FIG. 8 shows functional blocks implemented by execution of an image-processing program in the second exemplary embodiment by CPU 102. In this exemplary embodiment, the image-processing program is executed to implement incremental line determining section 206 instead of specific line segment extracting section 204. Incremental line determining section 206 is a section for determining incremental lines in a graph.

(Operation of Second Exemplary Embodiment)

Figure 9:
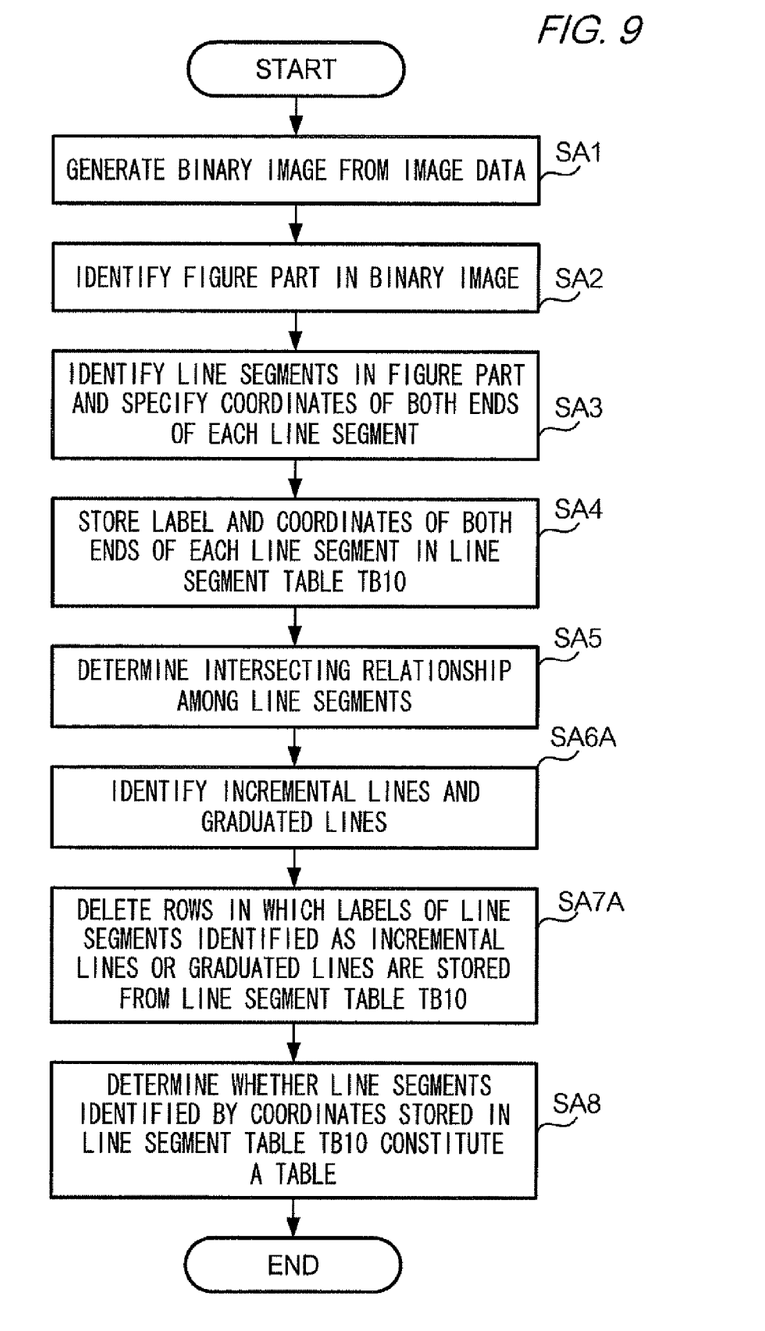
FIG. 9 is a flowchart showing a process flow executed by CPU 102 according to the second exemplary embodiment of the invention.
Figure 10:
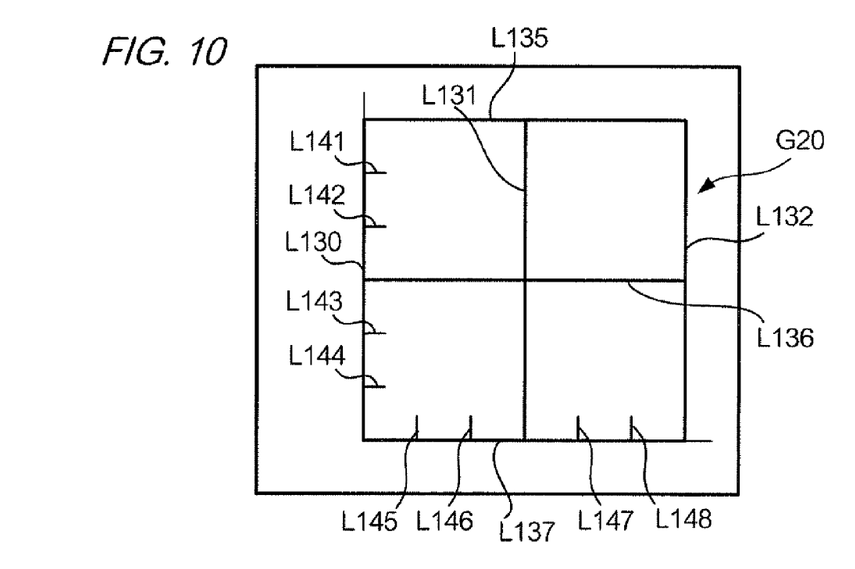
FIG. 10 is a schematic diagram showing an example of a binary image regarding the second exemplary embodiment of the invention.

In this exemplary embodiment also, first, image-acquiring section 108 acquires image data from the scanner, and CPU 102 that executes the image-processing program generates a binary image from the acquired image data (FIG. 9: step SA1). FIG. 10 shows an example of an image obtained by the binarizing process. In FIG. 10, image object G20 is an image of a graph having line segments L141-L148 that serve as incremental lines in the graph.

After the binarizing process is completed, CPU 102 analyzes the binary image to identify figure part(s) in the binary image (step SA2). Then, CPU 102 scans the binary image to identify line segments in the figure parts and determine the coordinates of each identified line segment (step SA3). For example, in the binary image of FIG. 10, line segments L130-L132 extending in a vertical direction in the drawing, line segments L135-L137 extending in a horizontal direction in the drawing, and line segments L141-L148 representing incremental lines of the graph are identified in image object G20. The coordinates of these line segments may be obtained, for example, by setting the lower left point of the image as the origin, with x-axis extending horizontally to pass the origin and y-axis extending vertically to pass the origin.

After identifying line segments in each figure part, CPU 102 provides each line segment with a label that uniquely indicates each line segment. Then, the figure identifiers allocated to respective figure parts, the labels allocated to respective line segments included in the figure parts identified by the figure identifiers, and the coordinates of both ends of each line segment are associated with each other and stored in line segment table TB10 provided in RAM 104 (step SA4).

It is to be noted that in this example of operation, with regard to the image of FIG. 10, labels "Li130"-"Li132" are generated for line segments L130-L132, respectively. Also, labels "Li135"-"Li137" are generated for line segments L135-L137, respectively, and labels "Li141"-"Li148" are generated for line segments L141-L148, respectively.

After completion of the process of step SA4, CPU 102 refers to the line segments allocated respective labels to determine an intersecting relationship between line segments (step SA5). Then, for each line segment, CPU 102 stores in line segment table TB10 the labels of other line segments that intersect the line segment. As a result of the above processes, line segment table TB10 shown in FIG. 11 is obtained.

After determining the intersecting line segments for each line segment, CPU 102 identifies incremental lines and graduated lines (step SA6A).

As a concrete example, CPU 102 identifies an incremental line as a line segment that intersects only a single line segment, and identifies a graduated line as a line segment that intersects with incremental lines.

Figure 11:
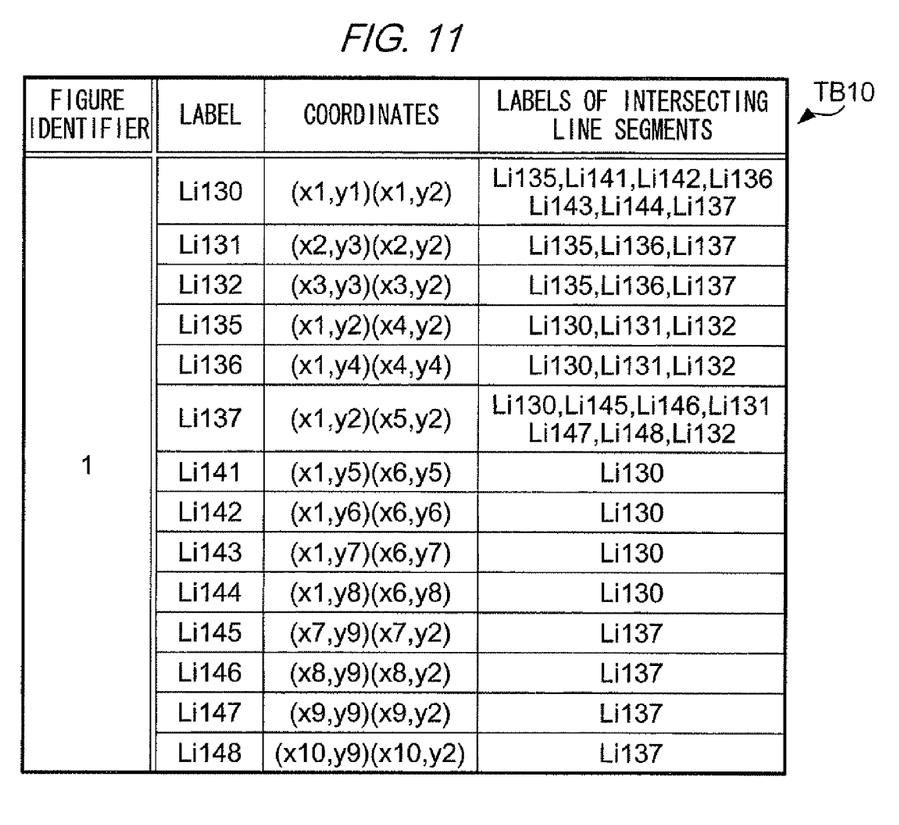
FIG. 11 shows an example of content of line segment table TB10 obtained by processing the image of FIG. 10 according to the second exemplary embodiment of the invention.

For example, as shown in line segment table TB10 of FIG. 11, line segments L141-L144, which are allocated labels Li141-Li144, respectively, each intersect only a single line segment (i.e., line segment L130 with label L130), and thus are identified as incremental lines. Further, line segment L130 is identified as a graduated line because it intersects with incremental lines L141-L144. Similarly, line segments L145-L148, which are allocated labels Li145-Li148, respectively, each intersect only a single line segment L137 (label Li137), and thus are identified as incremental lines. Accordingly, line segment L137, which intersects with these incremental lines L145-L148, is identified as a graduated line.

Subsequently, CPU 102 deletes the rows of line segment table TB10 in which the labels of the line segments extracted as incremental lines or as graduated lines in step SA6A are contained (step SA7A).

In the case of the image of FIG. 10, the rows in which labels "Li141"-"Li148" that correspond to line segments L141-L148, respectively, are contained are deleted from line segment table TB10.

Figure 12:
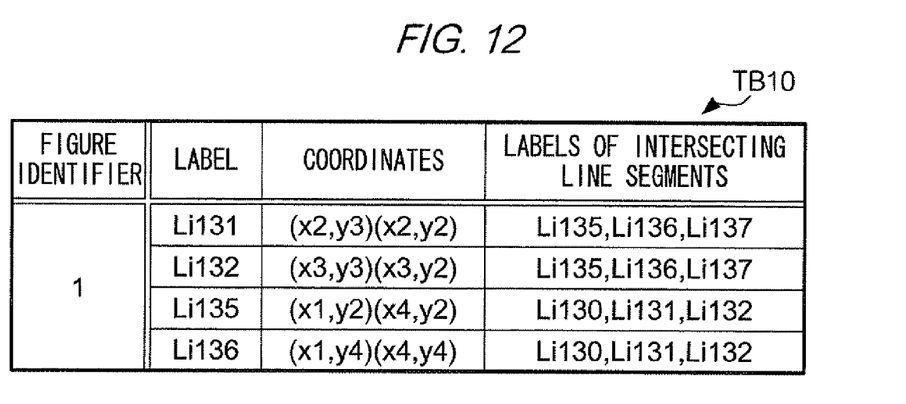
FIG. 12 shows line segment table TB10 after deletion of rows corresponding to some labels according to the second exemplary embodiment of the invention.

Further, the rows in which labels "Li130" and "Li137" that correspond to line segments L130 and L137, respectively, are contained are also deleted from line segment table TB10. As a result, line segment table TB10 as shown in FIG. 12 is obtained. It is to be noted that in this exemplary embodiment also, a row containing the label of a line segment that has no intersecting line segments may be deleted from line segment table TB10.

After completion of the process of step SA7A, CPU 102 judges whether the remaining line segments specified by the coordinates contained in line segment table TB10 constitute a table (step SA8).

Regarding the part corresponding to image object G20, the total number of black pixels contained therein is equal to the sum of the number of black pixels representing line segments L130-L132, line segments L135-L137, and line segments L141-L148.

On the other hand, the number of black pixels of the line segments included in this part and judged as potentially constituting a table is equal to the sum of the number of black pixels representing line segments L131, L132, L135, and L136.

If a value obtained by dividing the sum of the number of black pixels representing line segments L131, L132, L135, and L136 with the sum of the number of black pixels representing line segments L110-L132, is line segments L135-L137, and line segments L141-L148 is smaller than a predetermined threshold value (for example, 0.9), CPU 102 determines that image object G20 shown in FIG. 10 is not a table region.

[Modifications]

In the foregoing, explanation is made of exemplary embodiments of the present invention, but the present invention is not limited to the above-described exemplary embodiments and may be carried out in various other embodiments. For example, the above embodiments may be modified as follows in practicing the present invention. It is to be noted that the above-described embodiments and the following modifications may be used in any combination, as necessary.

It is possible to combine the first and second exemplary embodiments described above so that CPU 102 for executing the image-processing program carries out both of the processes shown in FIG. 3 and FIG. 9.

For example, in the above-described second exemplary embodiment, when a line segment having an arrow-shaped end portion is identified in a figure part, this figure part may be determined as not being a table region.

Also, in the above-described first exemplary embodiment, when a graduated line (i.e., a line that intersects incremental lines) is identified in a figure part, this figure part may be determined as not being a table region.

Figure 13:
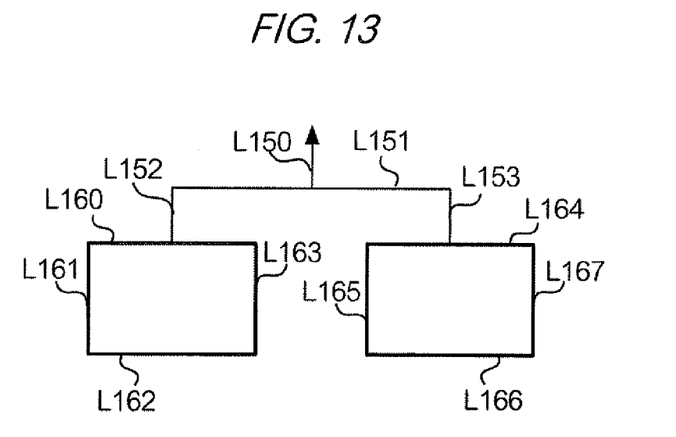
FIG. 13 shows an example of a binary image.

Further, in the above-described exemplary embodiments, it is possible to judge whether a rectangle(s) is formed by some of the line segments stored in line segment table TB10, and delete the rows regarding line segments that do not contribute to the formation of rectangle(s) from line segment table TB10. For example, in an image shown in FIG. 13, line segments L160-L163 constitute a rectangle and line segments L164-L167 constitute another rectangle, and thus the labels and coordinates of these line segments are stored in line segment table TB10. On the other hand, line segments L150-L153 do not contribute to the formation of rectangles, and thus the labels and coordinates of these line segments are deleted from line segment table TB10. Consequently, for the image shown in FIG. 13, CPU 102 judges whether line segments L160-L167 constitute a table.

In the above-described exemplary embodiments, CPU 102 executes an image-processing program to process image data and identify a table region in the image data, but the configuration for applying the above-described image processing to an image represented by image data is not limited to such an embodiment. For example, a hardware device such as a DSP (Digital Signal Processor) or a programmable logic device for executing the processes of first and/or second exemplary embodiments may be connected to bus 101, and image data may be provided to the hardware so that the processes of first and/or second exemplary embodiments can be carried out by the hardware.

The above-described image processing program may be provided in a state stored in a computer-readable storage medium such as a magnetic storage medium (magnetic tape, magnetic disk (HDD (Hard Disk Drive), FD (Flexible Disk)), etc.), optical storage medium (optical disk (CD (Compact Disk), DVD (Digital Versatile Disk)), etc.), opto-magnetic storage medium, semiconductor memory, etc., and installed in computer device 1. It is also possible to download the image-processing program via communications network and install the downloaded program.

In the above-described exemplary embodiments, the image-processing program is executed by a PC, but a computer device other than a PC may execute the image-processing program. For example, the image-processing program may be executed by an image-forming device having a copy function and/or scanner function, so that the image-forming device carries out the processes explained above with respect to the first and/or second exemplary embodiments.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing device comprising:
an acquisition section that acquires a binary image represented by first pixels each having a first pixel value and second pixels each having a second pixel value;
a figure part identifying section that identifies a figure part in the binary image;
a line segment identifying section that identifies line segments included in the figure part identified by the figure part identifying section;
a specific line segment extracting section that determines whether each line segment identified by the line segment identifying section has an end portion having a specific shape, and extracts a line segment with an end portion having the specific shape as a specific line segment; and
a table region determining section that determines whether the figure part identified by the figure part identifying section is a table region based on the line segments identified by the line segment identifying section excluding the specific line segment extracted by the specific line segment extracting section.

2. The image-processing device according to claim 1, further comprising an intersection determining section for determining an intersecting relationship between the line segments identified by the line segment identifying section, wherein the table region determining section determines whether the figure part identified by the figure part identifying section is a table region based on the line segments identified as intersecting other line segment(s) by the intersection determining section among the line segments identified by the line segment identifying section excluding the specific line segment.

3. An image-processing device comprising:
an acquisition section that acquires a binary image represented by first pixels each having a first pixel value and second pixels each having a second pixel value;
a figure part identifying section that identifies a figure part in the binary image;
a line segment identifying section that identifies line segments included in the figure part identified by the figure part identifying section;
an intersection determining section that determines an intersecting relationship between the line segments identified by the line segment identifying section;
an incremental line identifying section that identifies an incremental line from among the line segments identified by the line segment identifying section;
a graduated line identifying section that identifies a line segment that intersects the incremental line as a graduated line from among the line segments identified by the line segment identifying section; and
a table region determining section that determines whether the figure part identified by the figure part identifying section is a table region based on the line segments identified by the line segment identifying section excluding the incremental line and the graduated line.

4. The image-processing device according to claim 3, wherein the line segments based on which the table region determining section determines whether the figure part identified by the figure part identifying section is a table region further excludes a line segment that does not intersect other line segments.

5. A method for determining whether a table region is included in an image, comprising:
- acquiring a binary image represented by first pixels each having a first pixel value and second pixels each having a second pixel value;
- identifying a figure part in the binary image;
- identifying line segments included in the figure part;
- determining whether each line segment identified by the line segment identifying step has an end portion having a specific shape, and extracting a line segment with an end portion having the specific shape as a specific line segment; and
- determining whether the figure part identified by the figure part identifying step is a table region based on the line segments identified by the line segment identifying step excluding the specific line segment.

6. A method for determining whether a table region is included in an image, comprising:
- acquiring a binary image represented by first pixels each having a first pixel value and second pixels each having a second pixel value;
- identifying a figure part in the binary image;
- identifying line segments included in the figure part;
- determining an intersecting relationship between the line segments identified by the line segment identifying step;
- identifying an incremental line from among the line segments identified by the line segment identifying step;
- identifying a line segment that intersects the incremental line as a graduated line from among the line segments identified by the line segment identifying step; and
- determining whether the figure part identified by the figure part identifying step is a table region based on the line segments identified by the line segment identifying step excluding the incremental line and the graduated line.

7. A non-transitory computer readable storage medium storing a program causing a computer to execute a process for determining whether a table region is included in an image, the process comprising:
- acquiring a binary image represented by first pixels each having a first pixel value and second pixels each having a second pixel value;
- identifying a figure part in the binary image;
- identifying line segments included in the figure part;
- determining whether each line segment identified by the line segment identifying step has an end portion having a specific shape, and extracting a line segment with an end portion having the specific shape as a specific line segment; and
- determining whether the figure part identified by the figure part identifying step is a table region based on the line segments identified by the line segment identifying step excluding the specific line segment.

8. A non-transitory computer readable storage medium storing a program causing a computer to execute a process for determining whether a table region is included in an image, the process comprising:
- acquiring a binary image represented by first pixels each having a first pixel value and second pixels each having a second pixel value;
- identifying a figure part in the binary image;
- identifying line segments included in the figure part;
- determining an intersecting relationship among the line segments identified by the line segment identifying step;
- identifying an incremental line from among the line segments identified by the line segment identifying step;
- identifying a line segment that intersects the incremental line as a graduated line from among the line segments identified by the line segment identifying step; and
- determining whether the figure part identified by the figure part identifying step is a table region based on the line segments identified by the line segment identifying step excluding the incremental line and the graduated line.

* * * * *